A. S. BAKER & C. SNASHALL.
WIND-MILL.
No. 6,991. Reissued March 14, 1876.
Fig. 1.
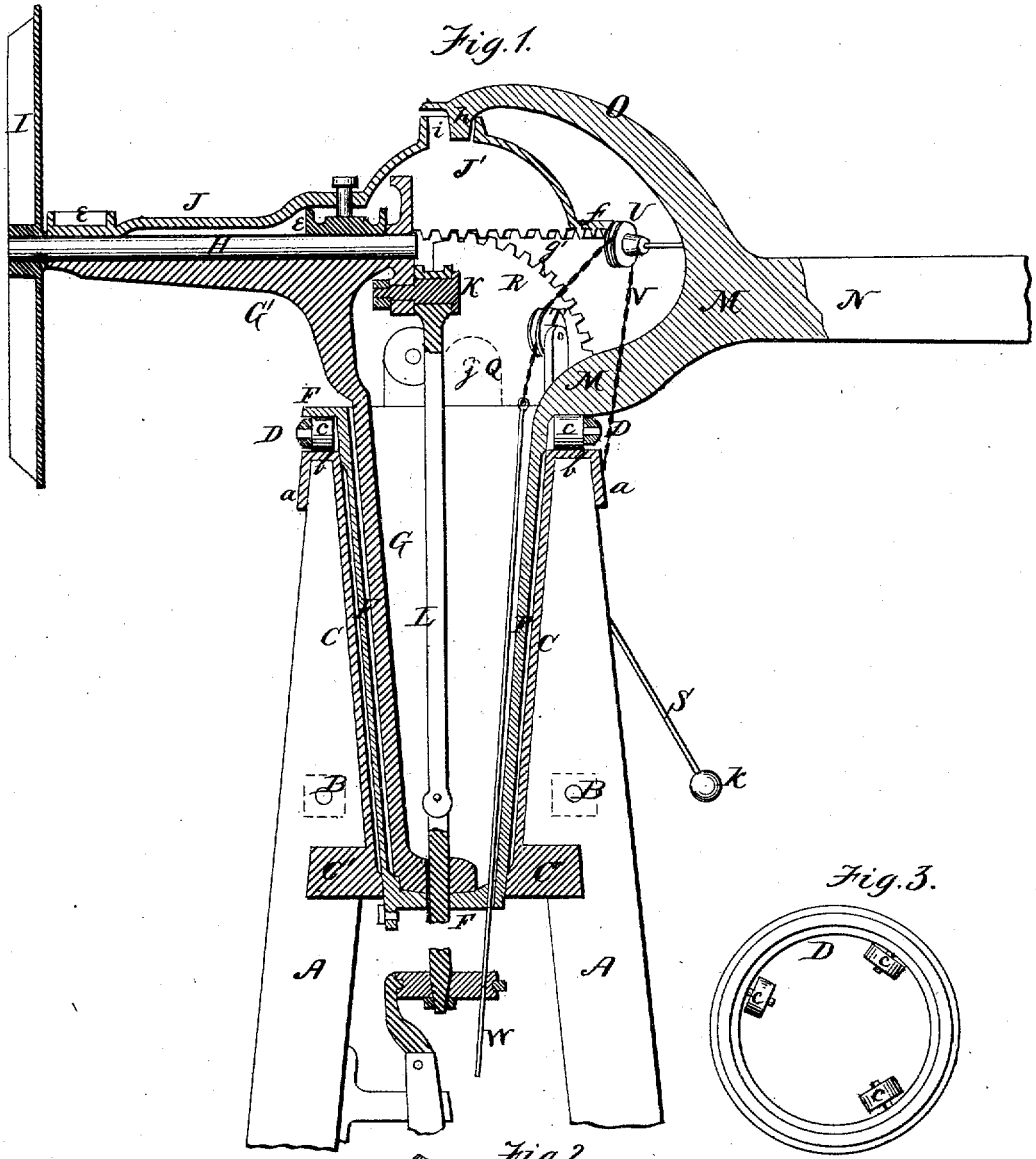
Fig. 3.
Fig. 2
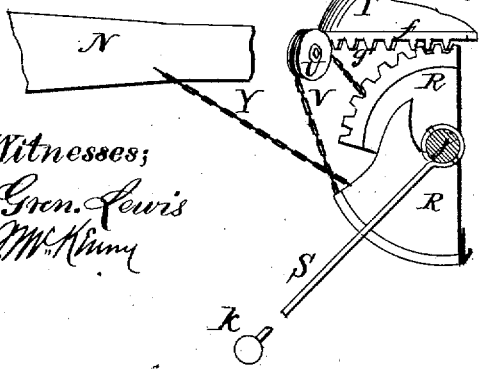
Witnesses;
Geo. Lewis
W. McKinney
Inventor;
Allen S. Baker and
Caleb Snashall
By Hill & Ellsworth
Their Attys.
N. PETERS, PHOTO-LITHOGRAPHER, WASHINGTON, D. C.

UNITED STATES PATENT OFFICE.

ALLEN S. BAKER AND CALEB SNASHALL, OF EVANSVILLE, WISCONSIN.

IMPROVEMENT IN WINDMILLS.

Specification forming part of Letters Patent No. 150,275 dated April 28, 1874; reissue No. 6,991, dated March 14, 1876; application filed March 1, 1876.

*To all whom it may concern:*

Be it known that we, ALLEN S. BAKER and CALEB SNASHALL, of Evansville, in the county of Rock and State of Wisconsin, have invented a new and useful Improvement in Windmills; and we do hereby declare the following to be a full and exact description thereof, reference being had to the accompanying drawings, forming part of this specification, in which—

Figure 1 is a vertical central section of the windmill in elevation. Fig. 2 is a separate view of the toothed gearing and their operating chains and weight, and Fig. 3 is a separate view of the friction-roller ring.

Similar letters of reference in the accompanying drawings denote the same parts.

This invention relates to that class of windmills in which the wheel automatically adjusts itself to the force of the air-currents by swinging laterally out of or into the wind.

In said class of windmills one great desideratum is to get a simple and effective means for initiating the lateral movement of the wheel when the wind becomes too heavy for it. Various expedients have been resorted to for the purpose, such as employing a top or side vane, hanging the wheel-shaft "off the the center," as it is termed, or, in other words, slightly out of line with the tail-vane, &c., all of which have their respective advantages and disadvantages.

The first part of our invention consists in a new mode of accomplishing this object, to wit: by so constructing the wheel and its connections that the force of the wind, when too great, will slightly raise the wheel and outer end of the wheel-shaft, and tip back their support, termed the "mill-head," which backward movement of said parts throws the wheel off of the center, and initiates its lateral movement out of the wind.

Another object in this class of mills has been to obtain the most practical and effective means for protecting the operating mechanism from the weather; and the second part of our invention consists in a new provision for that purpose.

A third object has been to obtain the simplest and best mode of connecting the mill-head and tail-vane, so as to secure the proper leverage to return the wheel to the wind; and the third part of our invention accordingly consists in a new means for accomplishing that object.

A fourth desideratum in this class of mills has been to obtain the best means of supporting both the mill-head and tail-vane, and affording them their respective movements; to which end the fourth part of our invention consists in a new combination of wheel-support and vane-support, arranged concentrically, one within the other, both being held within a suitable outer bearing, and supported by friction-rollers, which permit them to move easily in said bearing.

In the drawings, A represents one of the standards, of which there are four, composing the tower, of suitable dimensions, drawing in toward each other at the top, and suitably tied by the screw-bolts B. To the top of this tower is fitted a suitable socket or bearing, C C′ *b a*, for supporting and centering the working parts of the mill, the essential requisites of which bearing are that it should have a central opening, circular in horizontal cross-section, so as to properly center the parts contained within it, and allow them to revolve around a vertical axis of revolution, and that it should have a horizontal shoulder or surface adapted to wholly or partially support the weight of such revolving parts. Secondarily and incidentally such bearing or socket may be also employed to strengthen and bind together the top of the tower.

Within the socket or bearing is arranged the revolving support or journal F of the tail-vane, which, as here shown, is constructed in a practically tubular form, centered within the bearing, and provided with a supporting flange or surface corresponding to the horizontal shoulder or supporting-surface of the bearing, and traveling around on friction-rollers *c*, interposed between said two horizontal surfaces. The friction-rollers may be properly spaced by connecting them to a loose metal ring, D. The tail-vane N is attached to one side of the support F by means of a suitable arm, M, at the upper end of the support. From the same arm M another arm, O, curves upwardly and inwardly till its inner end is over the vertical axis of the mill, where it is provided with a stud, *h*, extending downward from its under side. In connection with the revolving vertical vane-support F, we employ an independently-revolving vertical mill-head support, G, so arranged with relation to the vane-support that one revolves within the other, the inner one being centered and supported by the outer one, and the outer one centered and supported by the bearing above described. An arm, G′, extends upward and outward from the top of the support G, for the purpose of sustaining the shaft H of the wind wheel I, suitable journal boxes *e e* being connected with it for that purpose. The shaft H, and its bearings, are covered and protected from the weather by a suitable metal plate, J, which supports at its rear or inner end an expanded cover or dome, J′, adapted to cover and protect the working-parts beneath it. The wheel-shaft H is connected by means of a crank, K, and pitman, L, to the machinery to be operated by the mill, said pitman being suitably jointed beneath the crank to allow it a proper degree of flexibility, and prevent its lower part from "binding" in the guides through which it passes. Now, the first feature of our invention consists, as above stated, in adapting the mill-head (which in our improved mill is composed of the parts G′ J I′) to be moved backward by the undue force of the wind, and thereby to throw the wind-wheel "off of the center," or cause the wheel-shaft and tail-vane to "break joints." In order to permit, and at the same time to properly limit, this backward movement of the head, the stud *h* is caused to project downward into a narrow elongated slot, *i*, in the dome J′, which prevents the dome or head from having any lateral movement, and allows it a backward and forward movement equal to the length of the slot, less the diameter of the stud.

The weight of the wheel normally holds the head forward; but whenever the wind becomes sufficiently strong it will press back the wind-wheel and its connected parts G G′ J J′ till the stud touches the forward end of the slot *i*, and in doing so will slightly raise the wind-wheel and forward end of its shaft. The continued force of the wind, acting upon the wheel in this position, will have the effect to at once throw it to one side or the other, and, as suitable stops are provided to prevent it from moving to one side, it must, necessarily, always swing to the other side, and thus move out of the wind. The deflecting action of the wind upon the wheel when raised or moved back out of its normal position is all the force required to throw the wheel out of line with the tail-vane. The slot in the dome J′ may be covered by a small flange on the end of the arm O, so as to prevent rain and snow from entering the mill-head through said slot. The working connection between the mill-head and the tail-vane is effected by providing the lower edge of the cover J′ with cog-teeth *g*′, which may be arranged upon a horizontal flange, *f*, and caused to gear with the teeth of a segment-wheel, R, supported and journaled upon the stud *j* of a lug, Q, attached to the part F. The position of the segment causes it to operate as a stop to prevent the wind-wheel from swinging to the wrong side of the center when laterally deflected by the wind, and a cord or chain, Y, extending from the lower part of the segment to the side of the tail-vane, causes the latter to hold the wheel to the wind so long as the force of the wind is not sufficient to move back the head and deflect the wheel, as above described. In the normal position of the wheel the chain Y is drawn taut; but when the wheel is laterally deflected the chain hangs slack. An adjustable weight, *k*, connected to the segment by a lever, S, serves to return the wind-wheel into the wind as the force of the latter abates.

The weight *k*, it will be observed, is a weight of varying resistance, its reacting force increasing in proportion to the extent of deflection of the wind-wheel. A chain, V, secured at the lower edge of the segment R, passes in a groove around said lower edge, thence over pulleys U and T attached at suitable points to the vane-support, and thence down into the cavity of said vane-support, where it is connected with a rod, W, which extends down through the bottom of the vane-support far enough to be within convenient reach for operation by hand.

Having thus described our invention, we claim as new—

1. A windmill, in which the initial lateral movement of the wheel out of the wind is effected automatically by the force of the wind tipping the wheel backward.

2. In a windmill, the combination of the shaft-support and shaft-cover, with a dome or cover supported by said parts, and arranged over the central opening of the mill, to protect the working parts beneath from the elements.

3. The combination of the mill-head support G G′, wheel and shaft I H, cover J, and dome I′, substantially as and for the purposes set forth.

4. The combination of the slotted dome I′, attached to the mill-head, and the stud *h*, attached to an arm extending from the tail-vane, substantially as and for the purposes set forth.

5. The combination of a gear-rim attached to the mill-head, and having cog-teeth at its lower edge, with an independent toothed segment gearing therewith, and with a chain or cord, Y, extending from the segment to the tail-vane, substantially as and for the purposes described.

6. The combination of a hand device, W V, for drawing the wheel around, with the segment R, and a gear-rim toothed around its lower edge and fixed to the mill-head, substantially as and for the purposes described.

7. The combination of the weight *k* with the segment R, the gear-rim toothed around its lower edge and gearing with the segment, and the wind-wheel and its support, substantially as and for the purposes described.

8. The combination of an elongated and downwardly-extending support and axis, F, for the tail-vane, and an elongated and downwardly-extending support and axis, G, for the mill-head, one arranged within the other, and a suitable centering and supporting bearing surrounding the outer one, and in which they both work, substantially as described.

9. The combination of friction-rollers *c c*, with a shouldered bearing and supporting plate, and with an elongated and downwardly-extending tubular support and axis, F, for the tail-vane, whereby the tail-vane is centered by its tubular portion extending down in the bearing, and is supported by the friction-rollers resting and working on the horizontal shoulder or surface of said bearing-plate, substantially as described.

10. The combination of a practically-tubular bearing with an elongated and practically-tubular axis for the tail-vane, and an elongated axis for the mill-head, one of said axes working within the other, and with a loose-revolving ring, D, connected with a set of friction-rollers, *c c*, substantially as and for the purposes described.

11. The combination of the elongated and tapering tubular bearing C, the elongated and tapering tubular axis F, and the elongated and tapering axis G, substantially as and for the purposes described.

12. The combination of the parts C F G G′ with the wheel and shaft H I, and the jointed pitman L, extending from the wheel-shaft down through, and guided by, an aperture in the lower end of the parts F G, substantially as described.

CALEB SNASHALL.
ALLEN S. BAKER.

Witnesses:
W. S. SMITH,
J. S. HOSKINS.